United States Patent
Kim et al.

(10) Patent No.: US 7,627,685 B2
(45) Date of Patent: Dec. 1, 2009

(54) SYSTEM AND METHOD FOR CONTROLLING TRANSPORT RATE OF REAL TIME STREAMING SERVICE

(75) Inventors: Ji Hye Kim, Seoul (KR); Kun Su Kim, Seoul (KR); Jong Sung Kim, Suwon-si (KR); Hang Dong Seong, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 410 days.

(21) Appl. No.: 11/284,896

(22) Filed: Nov. 23, 2005

(65) Prior Publication Data
US 2006/0168296 A1    Jul. 27, 2006

(30) Foreign Application Priority Data
Dec. 16, 2004    (KR) ............... 10-2004-0107266

(51) Int. Cl.
*G06F 15/16*    (2006.01)
(52) U.S. Cl. .............. 709/231; 709/203; 709/224; 709/234; 709/235
(58) Field of Classification Search .......... 709/223, 709/224, 231, 233
See application file for complete search history.

(56) References Cited

U.S. PATENT DOCUMENTS 6,850,965 B2 *  2/2005  Allen ................... 709/203
6,978,312 B2 * 12/2005  Eydelman et al. ......... 709/235
2003/0182437 A1 *  9/2003  Kobayashi et al. ........ 709/232

FOREIGN PATENT DOCUMENTS

WO    WO 03/026232 A1    3/2003
WO    WO 03/098935 A2    11/2003

* cited by examiner

*Primary Examiner*—Yves Dalencourt
(74) *Attorney, Agent, or Firm*—McKenna Long & Aldridge LLP

(57) ABSTRACT

A system and a method for controlling transport rate of real time streaming service between a streaming server and a streaming client connected via a predetermined network. In transmitting multimedia contents to the streaming client, the streaming server controls the transport rate by compensating as much as accumulatively added average value a difference between a buffer level reported from the streaming client and a required buffer level. Furthermore, in order to prevent an initial reproduction delay, the streaming server controls by a maximum transport rate allowed by the network. By which, an overflow or an under-run of buffer occurring when streaming service is given for a long time can be prevented, and a time delay can be minimized from a time of streaming start point to a time of reproduction in actual screen or sound.

14 Claims, 4 Drawing Sheets

SYSTEM AND METHOD FOR CONTROLLING TRANSPORT RATE OF REAL TIME STREAMING SERVICE

This application claims the benefit of Korean Patent Application No. 2004-0107266, filed on Dec. 16, 2004, which is hereby incorporated by reference for all purposes as if fully set forth herein.

BACKGROUND OF THE INVENTION

1. Field of the Invention

The document relates to a system and a method for controlling transport rates of real time streaming services. The services are configured to control a transport rate of data transmitted from a streaming server to a client using a real time transport protocol, thereby maintaining a buffer level of a streaming client at a constant level.

2. Discussion of the Related Art

Conventionally, multimedia data, such as video data, computer animation data or any combination thereof, is all downloaded to a hard disc drive of a PC (Personal Computer), for example, via access to an Internet for reproduction of the same. However, in the streaming environment, the entire data may not be all downloaded, and the data can be reproduced real time in the course of buffering without first downloading the entire file data. In other words, streaming is the ability to view data without first downloading an entire file. In general, streaming is a multimedia data transmission method which reads, transmits and plays data on an Internet in real time.

When a streaming server and a streaming client are connected over a wired/wireless network, and the streaming server transmits the multimedia contents, the streaming client having received the transmission of the multimedia contents buffers the received contents and reproduces the contents real time.

Basically, the transport rate of the streaming server conforms itself to requirements of data to be transmitted. In audio/video stream packets transmitted by compression via Moving Picture Experts Group (MPEG), time information for controlling the transport rate of the streaming server is recorded in a header.

However, there arises a problem even if the transport rate is under prolonged time of streaming service. It is impossible to calculate an accurate transport speed even if the time information is of an extreme accuracy, and a small difference of transport speeds can cause a buffer overflow after prolonged time.

There is another problem in that the streaming server and the streaming client, each being an independent identity, have separate reference clocks, and fine differences of clocks are accumulated in the course of use of a cheap crystal oscillator to prevent provision of a stable operation.

FIG. 1 is a first graphical representation illustrating a buffer level change according to the related art.

As in FIG. 1, the buffer level keeps increasing if the transport speed of the streaming server is faster than the speed of data reproduced by an actual streaming client, resulting in a case of exceeding a maximum buffer level defined by the streaming client.

Another problem is that a method of determining a transport rate only by time information contained in the multimedia data to be transmitted causes to generate a time delay from a streaming start time to a start of an actual reproduction.

FIG. 2 is a second graphical representation illustrating a buffer level change according to the related art where a buffer level change following the start of the streaming is shown.

There is needed a minimum quantity of data for grasping and reproducing context of multimedia content in which an MPEG decoder of a streaming client is transmitted. This is because the streaming client can accept a delay variance to a certain degree. Subsequently, as in FIG. 2, 'a buffer level to be required' supposed to be filled in the buffer without reproducing the transmitted data is determined up to a certain level prior to the start of the reproduction.

However, control by a simple comparison of buffer level reported from the required buffer level and the streaming client can deteriorate the stability of the system, and a very small difference of transport speeds between the streaming server and the streaming client can result in generation of a buffer overflow or an under-run.

The streaming server is required to continuously control a transport rate in order to maintain a buffer level reported by the streaming client. Furthermore, there is a need of filling the buffer at a maximally fastest speed at a point where streaming starts for a fast reproduction.

SUMMARY OF THE INVENTION

One object of the present invention is to provide a system and a method for controlling transport rate of real time streaming service adapted to stably maintain a buffer level by controlling a transport rate of multimedia contents transmitted between a streaming server and a streaming client.

Another object is to provide a system and a method for controlling transport rate of real time streaming service adapted to minimize an initial reproduction delay by maximizing an initial transport rate from a streaming server to a streaming client.

In accordance with one aspect of the present invention, a method for controlling transport rate of real time streaming service comprises streaming multimedia contents in real time to a client connected a network where the client has a buffer. In this embodiment, the multimedia contents are divided and transmitted in response to a transport rate. The method further comprises sending to the server a buffer level which indicates a quantity of the multimedia contents which were transmitted to the client is stored in the buffer. The method also includes changing the transport rate to complete the transmission of the multimedia contents. Here, the server changes the transport rate by compensating an accumulated average value for a period of time relative to a difference between the buffer level and a pre-set required buffer level.

The server changes the predetermined transport rate to complete the transmission of the multimedia contents by a method of compensating an accumulated average value for a predetermined period of time relative to a difference between the received buffer level and a pre-set required buffer level.

The network is either a wired network or a wireless network, and is a wireless Local Area Network (LAN), a Bluetooth, a Zigbee, or an Ultra Wide Band (UWB).

The client transmits the buffer level using an APPlication (APP) message of a Real time Transport Control Protocol (RTCP).

The buffer level transmitted via the APP message may include at least one of User Datagram Protocol (UDP) socket buffer level, a streaming application buffer level operating in the client and a decoder buffer level for MPEG contained in the client, and, the buffer level transmitted via the APP message contains all the afore-mentioned.

The step of transmitting in response to the predetermined transport rate further comprises transmitting the multimedia contents at a maximum transport rate allowed by the network when streaming begins.

The server having started the transmission at the maximum transport rate maintains the maximum transport rate until the buffer level received by the client at a predetermined interval initially reaches the required buffer level.

Successively, the server changes the buffer level to the pre-set transport rate and transmits it for reproduction of the multimedia contents if the received buffer level reaches the required buffer level.

The accumulated average value is calculated where a difference between the buffer level received for the period of time and the required buffer level is multiplied by a weight factor, added up and averaged, and a difference relative to the most recently received buffer level is multiplied by a higher weight factor. The accumulated average value may be calculated by the following equation.

$$\Delta_t = \frac{\sum_{k=0}^{N-1} \omega^k (l_{t-k} - \Theta)}{\sum_{k=0}^{N-1} \omega^k} = K \sum_{k=0}^{N-1} \omega^k (l_{t-k} - \Theta)$$

Where, $\Delta t$ denotes the accumulated average value, N denotes the number of buffer level received during the predetermined period of time, lt-k denotes the buffer level received in the t-k th from the client, $\theta$ denotes the required buffer level, and $\omega k$ denotes the weight factor and a real number having a value from 0 to 1.

The server compensates the accumulated average value by changing the predetermined transport rate according to the following equation.

$$R_t = (1+\Delta_t) \times R_{t-1}$$

Where, $\Delta t$ denotes the accumulated average value, Rt−1 denotes a transport rate before the change, and Rt denotes the predetermined transport rate thus changed.

A streaming system according to the other embodiment of the present invention comprises a server and a client. The server streams multimedia contents in real time by dividing and transporting the multimedia contents at a transport rate. The client includes a buffer and transmits to the server at an interval a buffer level a quantity of the multimedia contents which was transmitted that is stored in the buffer. The server changes the transport rate where a difference between the transmitted buffer level and a required buffer level is compensated using an accumulated average value for a period of time. In this embodiment, the client completes the transmission of the multimedia contents.

BRIEF DESCRIPTION OF THE DRAWINGS

These and/or other aspects and advantages of the present invention will become apparent and more readily appreciated from the following detailed description, taken in conjunction with the accompanying drawings in which.

DETAILED DESCRIPTION OF THE ILLUSTRATED EMBODIMENTS

Figure 1:
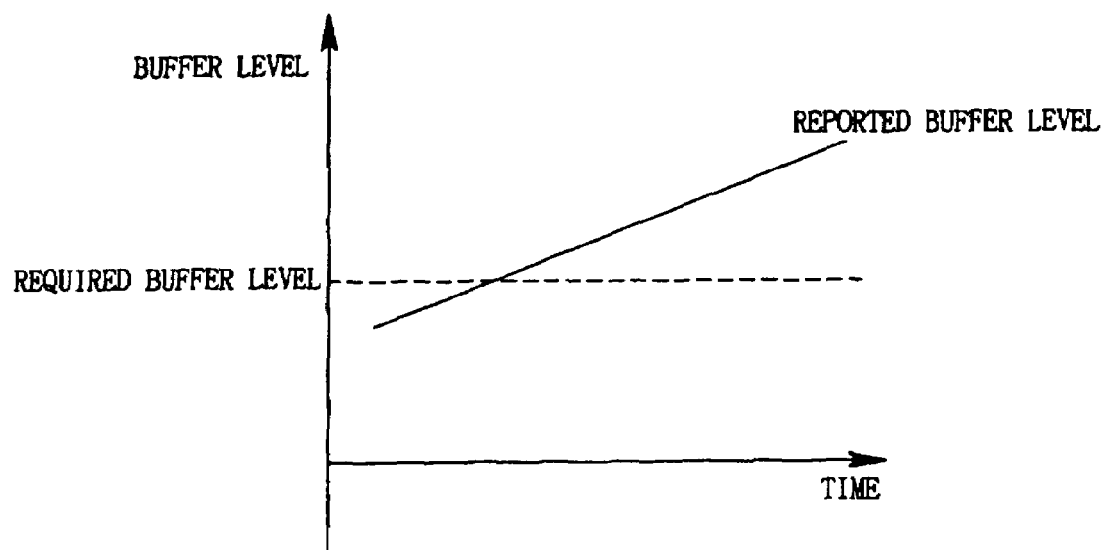
FIG. 1 is a graphical representation illustrating a buffer level change according to the related art.
Figure 2:
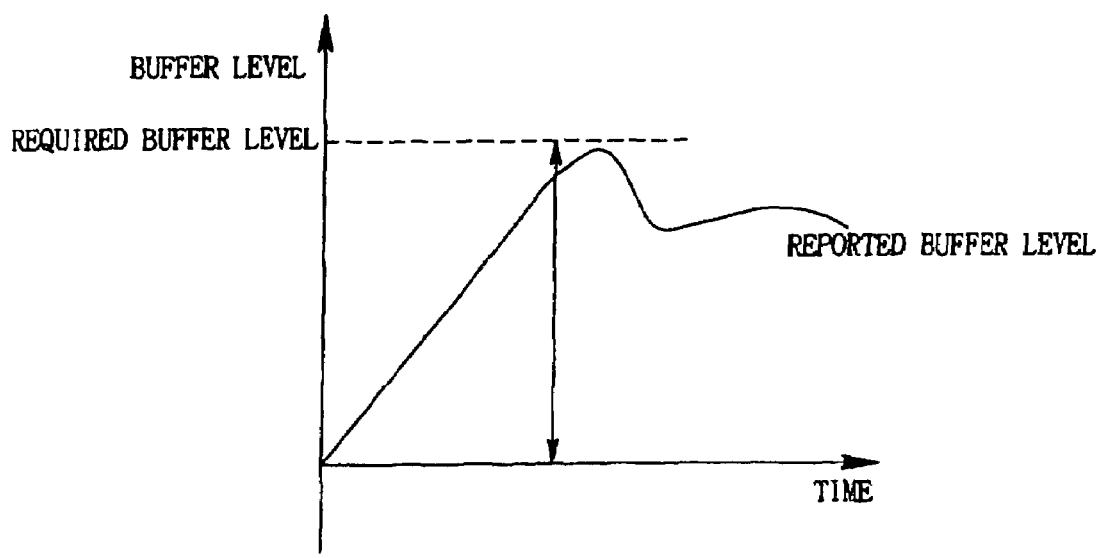
FIG. 2 is a graphical representation illustrating another buffer level change according to the related art.
Figure 3:
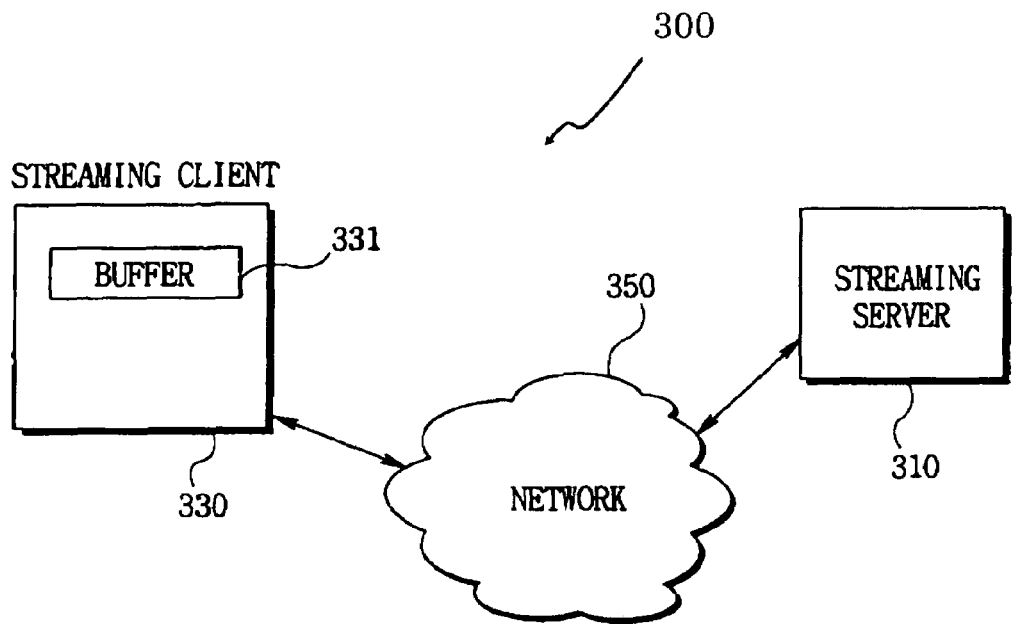
FIG. 3 is a block diagram illustrating a network including a streaming system according to the present invention.

The embodiments of the present invention will now be described in detail with reference to the accompanying drawings.

The system (300. hereinafter referred to as 'streaming system') applied with a transport rate control method of a streaming service according to the present invention comprises: a server (310); and a client (330). The server (310) and the client (330) are connected via a network (350), where the server (310) and the client (330) support Internet Protocol (IP).

The network (350) includes a wired network and a wireless network, and the wireless network may refer to a wireless LAN, a Bluetooth, a ZigBee, an Ultra Wide Band (UWB) and the like.

The server (310) transmits multimedia contents including an image and a sound data compressed by a predetermined method. The compression method thus mentioned includes Moving Picture Experts Group (MPEG) which is an international standard. Furthermore, the server (310) can compress by itself the multimedia contents including MPEG encoder (not shown).

The server (310) controls a stream packet via a buffer level reported from the client (330) to enable to maintain the buffer level of the client (310) at a predetermined level (hereinafter referred to as 'required buffer level').

The transport rate control with respect to the client (330) of the server (310) will be described in detail in the following. Furthermore, the server (310) transmits packets at a maximum transport rate allowed by the network (350) at an initial stage of the multimedia contents transmission to thereby fill a buffer (331) of the client (330) to the required buffer level within a short period of time.

The client (330) includes a predetermined capacity of buffer (331), and decodes a stream packet transmitted from the server (310) to produce an image and/or sound data, and reproduces the image and/or the sound data via a user interface (not shown) via a speaker or a display device.

The buffer (331) includes UDP socket buffer, a streaming application program buffer, and an MPEG decoder buffer.

The client (330) stores the received stream packet at the buffer (331), decodes and reproduces the stream packet. The client (330) transmits regularly or irregularly to the server (310) a buffer level indicating a currently stored quantity.

Figure 4:
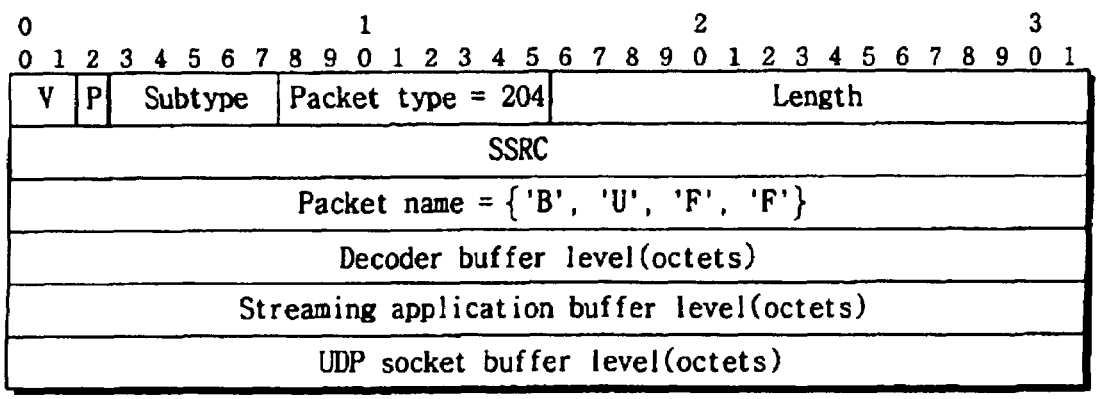
FIG. 4 is a constitutional diagram illustrating a message used by a client for transmitting a buffer level according to the present invention.

Referring now to FIG. 4, an explanation will be given where the client (330) of the streaming system (300) according to the present invention transmits a message to the server (310).

The client (330) uses an APP (APPlication) message of RTCP (Real time Transport Control Protocol) in order to notify a buffer level to the server (310).

The client (330) transmits three kinds of buffer levels including a UDP socket buffer level, a streaming application program buffer level, and an MPEG decoder buffer level.

The UDP socket buffer level defines a buffer level allocated for a packet received by the UDP protocol. The streaming application program buffer level denotes a buffer level allocated for a program reproducing or processing a streaming data received for supporting a user interface relative to the multimedia contents. Furthermore, the MPEG decoder buffer level represents a buffer level of a buffer allocated for a decoder (not shown) reproducing the multimedia contents by decoding the same.

The client (330) transmits the three kinds of buffer levels indicated in byte unit by filling the three kinds of buffer levels in conformity with a message format of FIG. 4. The server (310) uses the sum total of the three kinds of buffer levels.

The streaming data transmitted from the server (310) is first stored in the buffer (331). The streaming data stored in the buffer (331) is not transmitted to the MPEG decoder (not shown) until it reaches a buffer level required by the buffer level. If the MPEG decoder (not shown) decodes the data stored in the buffer if the buffer level reaches the required buffer level. The MPEG decoder (not shown) actually reads the streaming data at a speed faster than that of reproducing the streaming data in order to grasp the context of the data transmitted and stored in the buffer.

Hereinafter, the method for controlling the transport rate of real time streaming service will be described with reference to FIG. 5.

The server (310) initializes an initial transport speed (R0) of when stream packet corresponding to new multimedia contents starts to be transmitted, by a maximum transport speed (Rmax) allowed by the network (350) (S501).

The server (310) confirms a buffer level (lt) transmitted from the client (330) (S503). The server (310) discriminates whether the transmitted buffer level (lt) is larger than a buffer level (θ) required by the client (330) (S505).

As a result of the discrimination at S505, if the transmitted buffer level (lt) is larger than the required buffer level (θ), the server (310) changes the transport rate from the previous maximum transport rate (Rmax) to a normal transport rate (RDATA).

The normal transport rate (RDATA) of the streaming data denotes a transport rate under which the client (330) executes a normal reproduction. However, an initially applied transport rate uses a transport rate (RDATA) filed in a stream packet to be streamed. In other words, the transport rate (RDATA) represents a speed at which the multimedia contents transmitted from the server (310) is reproduced (S507).

As a result of the discrimination at S505, if the transmitted buffer level (lt) is smaller than the required buffer level (θ), the server (310) maintains the maximum transport rate (Rmax) in order to minimize an initial delay time until the transmitted buffer level (lt) reaches the required buffer level (θ).

Successively, the server (310) changes a transport rate ((Rt) in order to compensate a difference between the buffer level (lt) newly transmitted from the client (330) and the buffer level (θ) required by the client (330) (or MPEG decoder of the streaming client) until streaming of the multimedia contents to be streamed is completed (S509 to S515).

Hereinafter, the method for controlling the transport rate at S509 to S515 will be described in detail.

First of all, the server (310) receives from the client (310) the continuously changing current buffer level (lt) (S509).

The server (310) seeks an accumulated average value of a predetermined period of time relative to the difference between the required buffer level (θ) and the reported buffer level (lt) and compensate it.

The accumulated average value (Δt) can be calculated by the following equation 1.

$$\Delta_t = \frac{\sum_{k=0}^{N-1} \omega^k (l_{t-k} - \Theta)}{\sum_{k=0}^{N-1} \omega^k} = K \sum_{k=0}^{N-1} \omega^k (l_{t-k} - \Theta)$$ [Equation 1]

where, the accumulated average value (Δt) is calculated by the server (310) using a predetermined number (N) of buffer level (lt) most recently reported from the client (330). ωk is a real number having a value between 0 to 1, and is a weight factor used for reducing influence of the buffer level (lt) which is old in receipt from the client (330). θ is the required buffer level (S511).

The server (310) calculates a new transport rate (Rt) by adding a value of the accumulated average value (Δt) obtained by the Equation 1 multiplied by a previous transport rate (Rt−1) again to the previous transport rate (Rt−1). The new transport rate (Rt) can be obtained by the following Equation 2 (S513).

$$R_t = (1+\Delta_t) \times R_{t-1}$$ [EQUATION 2]

The server (310) having obtained the new transport rate transmits the multimedia contents to the client (330) by the transport rate (Rt) corrected by the Equation 2 and discriminates whether the transmission of the transport rate has been completed (S515).

As a result of the discrimination at S515, if the transmission of the multimedia contents has not been completed, the server (310) repeats the operations from S509 to S515 to continuously change the transport rate (Rt) in response to the buffer level changes.

Through the above-mentioned method, the streaming system (300) according to the present invention can prevent instability of transport rate according to the conventional method where the transmitted buffer level is simply compared with the requested buffer level to upward or downward adjust the transport rate.

Figure 5:
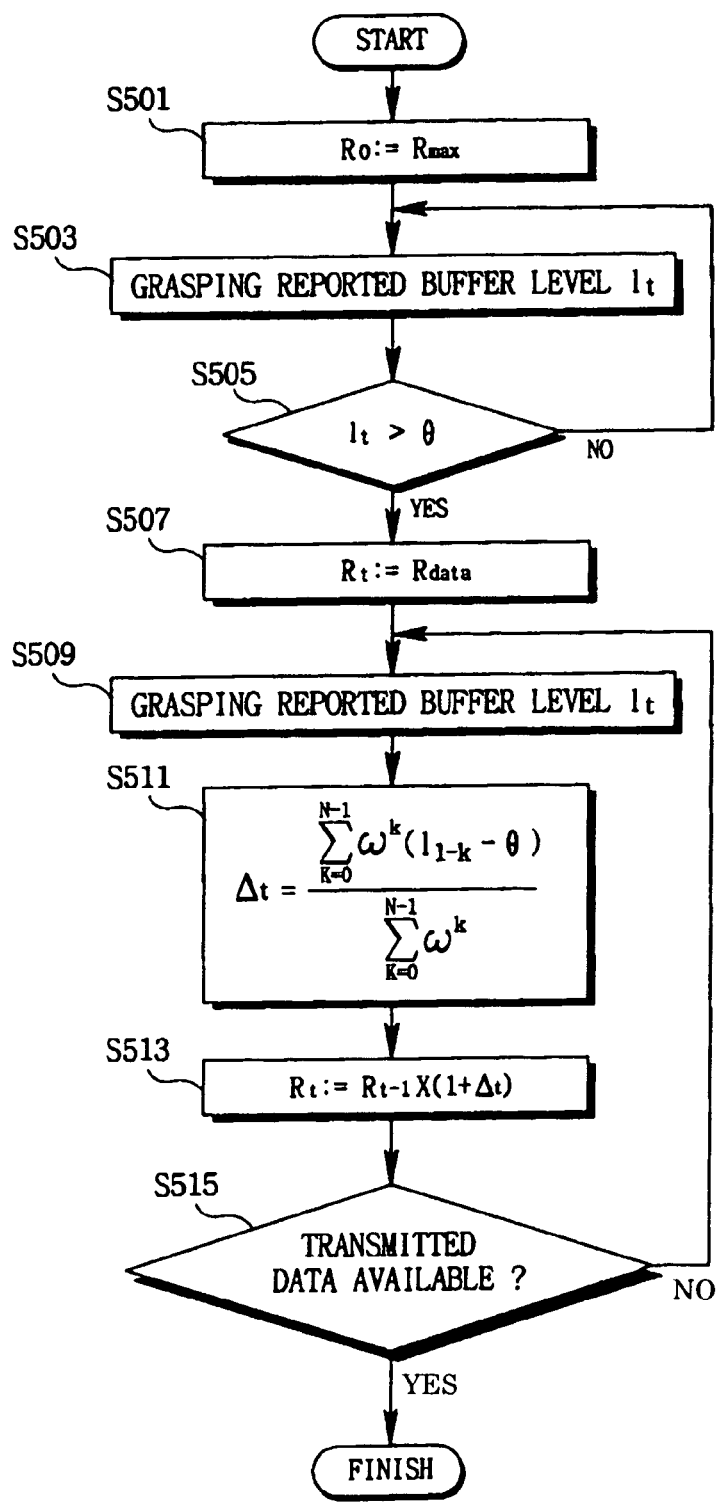
FIG. 5 is a flow chart illustrating a transport rate control method of a real time streaming service according to the present invention.
Figure 6:
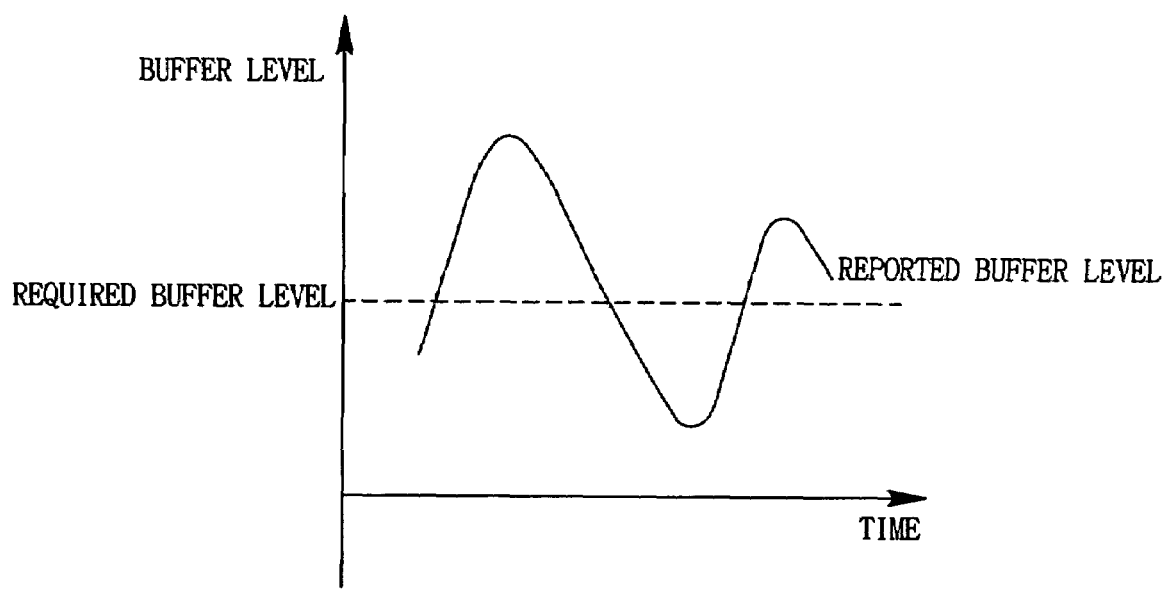
FIG. 6 is a graphical representation illustrating a buffer level change of a client according to the present invention.

FIG. 6 is a graphical representation illustrating a buffer level change of a client in using a transport rate control method of a real time streaming service of FIG. 5, where, it can be seen that the level of the buffer (331) of the client (330) is converging on the requested buffer level.

The transport rate control according to the present invention is realized by referring to the buffer level during the late time [t−(N−1), t], to thereby prevent a sudden change of the buffer level. Furthermore, a heavier weight is given to information of late buffer level to allow the data transport rate to converge on the reproduction rate of the client (330) at a speedy and stable level.

As apparent from the foregoing, there is an advantage in the system and the method for controlling the transport rate of real time streaming service thus described according to the present invention in that overflow or under-run of buffer that can occur when a long time streaming service is provided can be prevented, thereby enabling to provide a streaming service while maintaining a proper buffer level at all times.

The control thus described is possible by a relatively simple method because the buffer level of a client is given as a basis.

Furthermore, the streaming system according to the present invention uses the maximum transport rate allowed by the network in the initial transmission to enable to maximally shorten a time from a streaming start point to a time of reproduction in actual screen or sound.

The present invention may be embodied by a method, a device and a system. Furthermore, if the present invention is to be embodied by computer software, the constituting elements of the present invention may be replaced by code segments needed for performance of operations. Programs or code segments may be stored in a medium processible by a microprocessor and transmitted as computer data coupled to carrier waves via transmission media or communication networks. The media processible by the microprocessor include anything which can transmit and store information such as electronic circuits, semiconductor memory devices, ROM (Read Only Memory), flash memories, EEPROM (Electrically Erasable and Programmable Read Only Memory), floppy discs, optical discs, hard discs, optical fibers and radio networks. The computer data include data which can be transmitted via electrical network channels, optical fibers, electromagnetic fields, radio networks.

The present invention has been described above in varied detail by reference to particular embodiments and figures. However, these specifics should not be construed as limitations on the scope of the invention, but merely as illustration of some of the presently preferred embodiments. It is to be further understood that other modifications or substitutions may be made to the described by the skilled in the art without departing from the broad scope of the invention. The above-described particular embodiments and figures should not be individually interpreted from the ideas and aspects of the present invention.

What is claimed is:

1. A method for controlling a transport rate of real time streaming comprising:
    streaming multimedia contents in real time to a client connected to a server via a network, the client having a buffer, wherein the multimedia contents are divided and transmitted in response to a transport rate;
    sending to the server a buffer level indicating a quantity of the multimedia contents which were transmitted to the client and stored in the buffer;
    transmitting the multimedia contents at a maximum transport rate allowed by the network;
    receiving the buffer level transmitted from the client;
    maintaining the maximum transport rate until the received buffer level reaches the pre-set required buffer level;
    changing to a pre-set transport rate for reproduction of the multimedia contents if the received buffer level has reached the pre-set required buffer level, wherein the server changes the transport rate by compensating an accumulated average value for a period of time relative to a difference between the buffer level and a pre-set required buffer level, and
    wherein the accumulated average value is calculated where a difference between the buffer level received for the period of time and the required buffer level is multiplied by a weight factor, added up and averaged, and a difference relative to the most recently received buffer level is multiplied by a higher weight factor.

2. The method as recited in claim 1, wherein the network is a wireless network where the wireless network is a wireless Local Area Network (LAN), a Bluetooth, a Zigbee, or an Ultra Wide Band (UWB).

3. The method as recited in claim 2, wherein the client uses an APP (APPlication) message of a Real time Transport Control Protocol (RTCP) to send the buffer level.

4. The method as recited in claim 3, wherein the buffer level transmitted via the APP message includes at least one of a User Datagram Protocol (UDP) socket buffer level, a streaming application buffer level, and a MPEG decoder buffer level.

5. The method as recited in claim 1, wherein the accumulated average value is calculated by the following equation, $$\Delta_t = \frac{\sum_{k=0}^{N-1} \omega^k (l_{t-k} - \Theta)}{\sum_{k=0}^{N-1} \omega^k} = K \sum_{k=0}^{N-1} \omega^k (l_{t-k} - \Theta)$$

where, $\Delta_t$ denotes the accumulated average value, N denotes the number of buffer level received during the period of time, $l_{t-k}$ denotes the buffer level received in the t-k th from the client, $\Theta$ denotes the required buffer level, and $\omega^k$ denotes the weight factor and a real number having a value from 0 to 1.

6. The method as recited in claim 5, wherein the completion of the transmission compensates the accumulated average value by changing the predetermined transport rate according to the following equation, $$R_t = (1+\Delta_t) \times R_{t-1}$$

where, $\Delta_t$ denotes the accumulated average value, $R_{t-1}$ denotes a transport rate before the change, and $R_t$ denotes the transport rate thus changed.

7. The method as recited in claim 1, wherein the network is a wired network.

8. A streaming system comprising:
    a server connected to a network, the server streaming multimedia contents in real time by dividing and transporting the multimedia contents at a transport rate
    a client including a buffer, the client transmitting to the server at an interval a buffer level indicating a quantity of the multimedia contents which was transmitted to the client and stored in the buffer, wherein the server changes the transport rate where a difference between the transmitted buffer level and a required buffer level is compensated using an accumulated average value for a period of time, wherein the client completes the transmission of the multimedia contents;
    wherein the server begins transmission of the multimedia contents at a maximum transport rate allowed by the network, maintains the maximum transport rate until the buffer level received from the client at an interval reaches the required buffer level for a first time, and changes the buffer level to a pre-set transport rate and transmits the multimedia contents for reproduction if the received buffer level reaches the required buffer level; and
    wherein the accumulated average value is calculated where a difference between the buffer level received for the period of time and the required buffer level is multiplied by a weight factor, added up and averaged, and a difference relative to the most recently received buffer level is multiplied by a higher weight factor.

9. The system as recited in claim 8, wherein the network is a wireless network where the wireless network is a wireless Local Area Network (LAN), a Bluetooth, a Zigbee, or an Ultra Wide Band (UWB).

10. The system as recited in claim 9, wherein the client uses an APP (APPlication) message of a Real time Transport Control Protocol to transmit the buffer level.

11. The system as recited in claim 10, wherein the buffer level transmitted via the APP message includes at least one of a User Datagram Protocol (UDP) socket buffer level, a streaming application buffer level, and a MPEG decoder buffer level.

12. The system as recited in claim 8, wherein the accumulated average value is calculated by the following equation, $$\Delta_t = \frac{\sum_{k=0}^{N-1} \omega^k (l_{t-k} - \Theta)}{\sum_{k=0}^{N-1} \omega^k} = K \sum_{k=0}^{N-1} \omega^k (l_{t-k} - \Theta)$$

where, $\Delta_t$ denotes the accumulated average value, N denotes the number of buffer level received during the period of time, $l_{t-k}$ denotes the buffer level received in the t-k th from the client, $\theta$ denotes the required buffer level, and $\omega^k$ denotes the weight factor and a real number having a value from 0 to 1.

13. The system as recited in claim 12, wherein the completion of the transmission compensates the accumulated average value by changing the predetermined transport rate according to the following equation, $$R_t = (1+\Delta_t) \times R_{t-1}$$

where, $\Delta_t$ denotes the accumulated average value, $R_{t-1}$ denotes a transport rate before the change, and $R_t$ denotes the transport rate thus changed.

14. The system as recited in claim 8, wherein the network is a wired network.

* * * * *